UNITED STATES PATENT OFFICE.

FRANCIS L. STEWART, OF MURRYSVILLE, PENNSYLVANIA, ASSIGNOR OF ONE-HALF TO SAMUEL E. GILL, OF PITTSBURG, PENNSYLVANIA.

UTILIZATION OF MAIZE-EARS FOR THE PRODUCTION OF ALCOHOL.

No. 923,088.     Specification of Letters Patent.     Patented May 25, 1909.

Original application filed March 11, 1907, Serial No. 361,654. Divided and this application filed October 15, 1907, Serial No. 397,577. Renewed October 19, 1908. Serial No. 458,439.

*To all whom it may concern:*

Be it known that I, FRANCIS L. STEWART, a citizen of the United States, residing at Murrysville, in the county of Westmoreland and State of Pennsylvania, have invented certain new and useful Improvements in the Utilization of Maize-Ears for the Production of Alcohol, of which the following is a specification.

My invention relates to the obtaining of commercial products from corn, particularly maize or Indian corn.

My present application is a division of my application Serial Number 361,654, filed March 11, 1907.

I have discovered that by removing the ear while in the milk, or at the time specified in my U. S. Letters Patent No. 811,523, dated January 30, 1906, and at the same time stripping with the green and immature ears the foot stalk and enveloping husks, I can obtain several improved commercial products. By removing the ears in this manner, and at this time, as stated in said patent not only is the percentage of sugar in the remaining growing stalks largely increased during the further growing period, thus affording an improved commercial process for obtaining sugar; but at the same time the removed ears, together with their husks and foot stalks can be treated according to the present process, and other improved products obtained.

In carrying out my process, I preferably proceed as follows:—The immature ears, husks and foot stalks, plucked at about the time when the ear is in the milk or the roasting period, are ground up or reduced to a fine pulp by any suitable machine. The ground material is then transferred into a heating tank or digester, together with about an equal volume of water strongly acidulated with either oxalic or sulfuric acid. Other mineral acids may be used for the same purpose, although I prefer the acids named. The mixture, if introduced into an open heater, should then be heated for about two hours to a temperature of about 212° F.; and if introduced into a closed digester it is heated for about an hour under a pressure of about three atmospheres. It is then transferred into a percolating or draining tank, and after the fluid part has been run off the wet, pulpy matter is passed through a roller press or other machine capable of extracting the remainder of the liquid. This remaining liquid and the liquid part first run off, which contain the saccharified starches and other fermentable materials, are mixed together and passed into a tank, where it is treated with carbonate of lime, if oxalic acid has been used in the previous acidification, or an alkali, if another acid has been used, until sufficient has been introduced to neutralize the acid and render the liquid slightly alkaline, as indicated by litmus or phenolphalein test paper. By this treatment, the "wort," or fermentable liquid is purified and a precipitate is obtained from the liquid as a by-product, which I have found to have valuable properties. The chemical composition of this precipitate has not as yet been fully determined, but it appears to consist largely of albuminous matter. The purified wort, or liquid containing the fermentable matter from which this precipitate is obtained is then racked off into a fermenting vat; and if the operation has been properly conducted will have a specific gravity of about 1.080 or a density of about 11° Baumé, and will be free from impurities, which would otherwise impede or hinder its fermentation. In the fermenting vat it is brought to the proper temperature, and then fermented and distilled as in the ordinary manufacture of alcohol. The alcohol thus produced will be equal in all respects to that made from other sources. The press-cake, or half-dried, pulpy residuum is then further treated as described in my aforesaid application Serial Number 361,654, for the further recovery of valuable commercial products.

The advantages of my invention result from the discovery that these valuable products, namely, alcohol and the precipitate above referred to, may be obtained from the field or Indian corn when the ear is plucked at about the time mentioned. This process therefore provides for the obtaining of valuable products from corn, where the stalk of the plant is to be treated in accordance with my patent above referred to for the production of sugar.

I claim:—

1. In the method of utilizing ears of maize, the steps which consist in grinding the immature ears and husks and heating the ground mass with water; separating the liquid from the pulpy mass; and then adding a reagent to and separating an organic precipitate from the liquid.

2. In the method of utilizing ears of maize, the steps which consist in grinding the immature ears and husks; heating the ground mass with water and an acid; separating the liquid from the pulpy mass; adding an alkali to the liquid and thereby forming an organic precipitate; and then separating the precipitate from the liquid.

3. In the method of utilizing ears of maize, the steps which consist in plucking the ears while the kernel is in the milk; grinding the ears and husks, heating the ground mass with water and an acid; separating the liquid from the pulpy mass; adding an alkali to the liquid to form an organic precipitate; and then separating the precipitate from the liquid.

4. The method of utilizing ears of maize, which consists in grinding the immature ears and husks; heating the ground mass with acidulated water; separating the liquid from the pulp, adding an alkali to the liquid and thereby forming an organic precipitate; separating the precipitate from the liquid; and then fermenting and distilling the liquid.

5. The method of utilizing ears of maize, which consists in grinding the ears and husk while the kernel is in the milk; mixing the ground mass with strongly acidulated water; heating the mass; separating the liquid from the pulp; adding an alkali until the liquid is slightly alkaline by test and thereby forming a precipitate; separating the precipitate from the liquid and then fermenting and distilling the liquid to recover the alcohol.

In testimony whereof, I have hereunto set my hand.

FRANCIS L. STEWART.

Witnesses:
GEO. B. BLEMING,
C. P. BYRNES.